United States Patent Office.

JOSHUA G. NICKERSON, OF BOSTON, MASSACHUSETTS.

Letters Patent No. 92,744, dated July 20, 1869.

IMPROVED FERTILIZER FROM SEA-WEED.

The Schedule referred to in these Letters Patent and making part of the same.

*To all persons to whom these presents may come:*

Be it known that I, JOSHUA G. NICKERSON, of Boston, in the county of Suffolk, and State of Massachusetts, have made or invented a new a useful Improvement in the Preparation of Sea-Weed, or Algæ, for Fertilizing-Purposes; and do hereby declare the same to be fully described as follows:

First, I take the weed in its normal condition, or partially dried, and cut or reduce the same into small pieces, by means of knives or other suitable mechanism.

Next, I subject the mass to the action of heat or air, applied in such manner as to effectually dry or evaporate from it any moisture it may contain.

Next, I mix the article, so prepared, with one or more animal, vegetable, or mineral matters, such as are usually employed as fertilizers, and subsequently grind the whole in a mill, so as to thoroughly incorporate the substances and reduce them to a finely-divided state.

To this end, I employ fish or animal scrap, phosphate or sulphate of lime, chloride of sodium, guano, or various other matters, commonly known as possessing fertilizing-properties.

I claim as my invention the following:

1. The process, as described, of preparing the algæ, or sea-weed for being mixed with one or more other fertilizers.

2. The mixing of it, so prepared, with one or more animal, mineral, or vegetable matters, known as fertilizers, and subsequently grinding the whole together in a grinding-mill, the whole being productive of an improved article of manufacture, for use as a fertilizer.

3. I claim the new manufacture or fertilizer, as made in manner as set forth.

JOSHUA G. NICKERSON.

Witnesses:
R. H. EDDY,
S. N. PIPER.